United States Patent [19]

Rivier

[11] Patent Number: 4,540,241

[45] Date of Patent: Sep. 10, 1985

[54] CONSTRUCTION PANEL

[76] Inventor: Jean-Jacques Rivier, 467 Frontiere, Hemmingford, Canada, L0L-1H0

[21] Appl. No.: 508,653

[22] Filed: Jun. 28, 1983

[30] Foreign Application Priority Data

Jul. 12, 1982 [CH] Switzerland ........................... 824231

[51] Int. Cl.$^3$ ........................ G02B 17/00; G02B 27/00

[52] U.S. Cl. ...................................... 350/261; 350/265

[58] Field of Search .................................. 350/258–265

[56] References Cited

U.S. PATENT DOCUMENTS 3,255,665 6/1966 Weiher et al. ....................... 350/262

*Primary Examiner*—Richard A. Wintercorn

*Attorney, Agent, or Firm*—Holman & Stern

[57] ABSTRACT

A construction element such as a wall, a partition, a skylight, etc., comprises rigid panels, the essential part of which consists of an assembly of transparent plates having one flat major surface and a second major surface provided with a relief. This relief is made up of inclined facets bounded by ridges which are parallel to each other, parallel to the flat surface, and disposed horizontally. The relief surfaces of pairs of plates fit into one another. The ridges of one panel element are offset downwardly relative to the homologous ridges of the other panel element. The arrangement, dimensions, and angles of the facets, as well as the thicknesses of the plates, are calculated and carried out in such a way that incident radiation, e.g., solar radiation, passes through the panel or is returned toward the front major surface according to the angle of incidence.

8 Claims, 6 Drawing Figures

FIG. 1
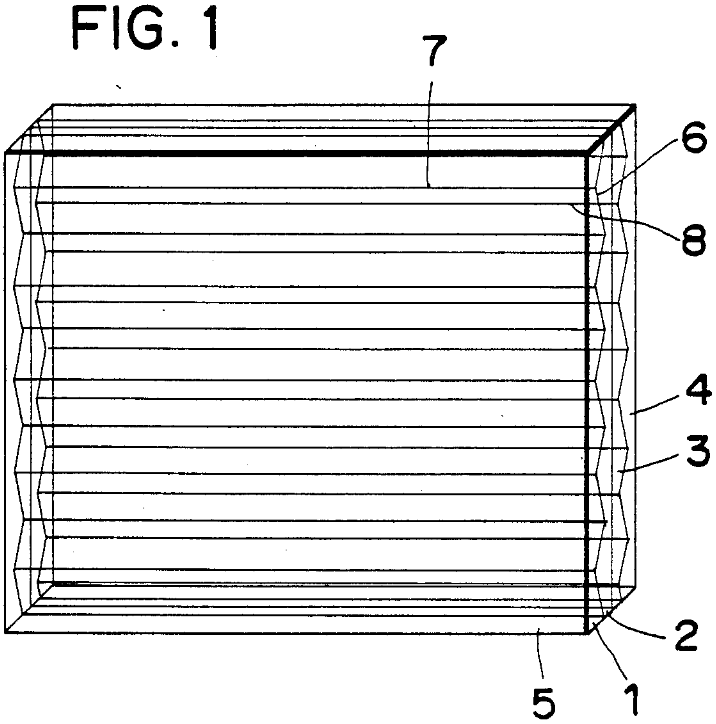
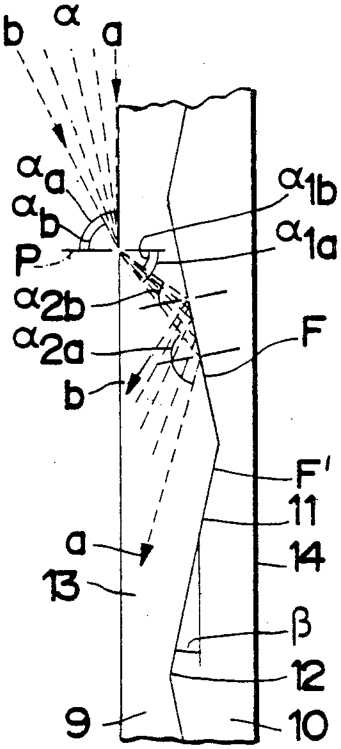
FIG. 2

SELECTON CURVE
CONFIGURATION: ANGLE 8° SYM.

| AL | 84 | 67 | 50 | 21 | 0 |
|---|---|---|---|---|---|
| AZ | 0 | 42 | 51 | 57 | 58 |

CONSTRUCTION PANEL

BACKGROUND OF THE INVENTION

1. Field of the Invention

This invention relates to construction elements, and more particularly to a panel of transparent material intended to form a construction element of the type having at least one flat bounding surface, the orientation of which determines a general plane of the panel, and at least one set of flat facets inclined relative to that general plane and disposed opposite the bounding surface in such a way that radiation issuing from a source outside the panel and passing through the transparent material undergoes at least in part the phenomenon of total reflection.

2. Description of the Prior Art

It has already been proposed to produce panels of this type for use as walls or partitions in dwellings, office buildings, or other premises to keep people inside from being blinded by direct insolation, while permitting as much irradiation as possible by means of the diffused sunlight. Thus, for example, U.S. Pat. No. 3,393,034 describes a design of this type in which the facing surfaces of two coupled plates of glass are provided with a configuration of facets forming horizontal ridges, constituting prisms which are nested into one another, one of the faces of each prism having an inclination which corresponds to the critical angle of the transparent material used, while the other facet is provided with an opaque coating which absorbs the radiation which has undergone total reflection. In this design, the radiation which undergoes total reflection on the facets of the prisms is therefore not returned toward the front side facing the source; moreover, the opaque surfaces naturally constitute obstacles to complete transparency of the panel. French Pat. Nos. 1,442,592 and 340,584 also describe designs of this type.

BRIEF SUMMARY OF THE INVENTION

It is an object of this invention to provide panels which can serve as construction elements, either as walls or partitions or as covering elements such as roofs, overhangs, skylights, etc., these panels being made up entirely of transparent materials and producing a selective effect upon the radiation coming from a source which may be the sun or a source of artificial light, so that part of this radiation is returned toward the source through total reflection, whereas the rest of the radiation passes through the panel, preferably without the parallelism of the rays being perturbed so as not to deform the images.

To this end, in the panel according to the present invention, of the type initially mentioned, the dimensions of the facets, their angles of inclination relative to the general plane of the panel, and the average distance between the bounding surface and the set of facets are determined in such a way that the major part of the radiation passing through the material of the panel between one bounding surface and the corresponding set of facets is transmitted through the panel or returned in the direction of the location of the source, the ratio between the parts of the radiation transmitted and returned being a predetermined function of the azimuth and/or the elevation of the source relative to the general plane of the panel.

As will be seen below, the arrangement thus defined can be carried out in numerous different practical forms, answering varied purposes and affording different advantages.

In a general manner, and in the most usual applications, the configuration of the panel will be predetermined in such a way that when it is disposed vertically, the radiation from the outside source e.g., the sun's is vertically completely reflected back as soon as the sun's angle of elevation exceeds a certain limit, whereas it passes through the panel as long as the maximum angle of elevation has not been reached, no matter what may be the orientation, or in other words, the azimuth, of the source. In practice, however, it will be seen that for each type of panel, the maximum angle of elevation depends on the azimuth, so that it is possible to plot a curve as a function of the azimuthal angle and of the angle of elevation, defining the limit of penetration of the solar rays through the panel.

BRIEF DESCRIPTION OF THE DRAWINGS

The principles on which the production of the panel according to the invention is based, as well as the various possible applications of this panel, will become more clearly apparent on the basis of the following description of preferred embodiments with reference to the accompanying drawings, wherein:

FIG. 1 is a diagrammatic perspective view of an assembly of plates constituting the essential part of one embodiment of the panel according to the invention;

FIG. 2 is a diagrammatic serving to explain the principle according to which certain parameters of the panel are determined;

DETAILED DESCRIPTION

Figure 4:
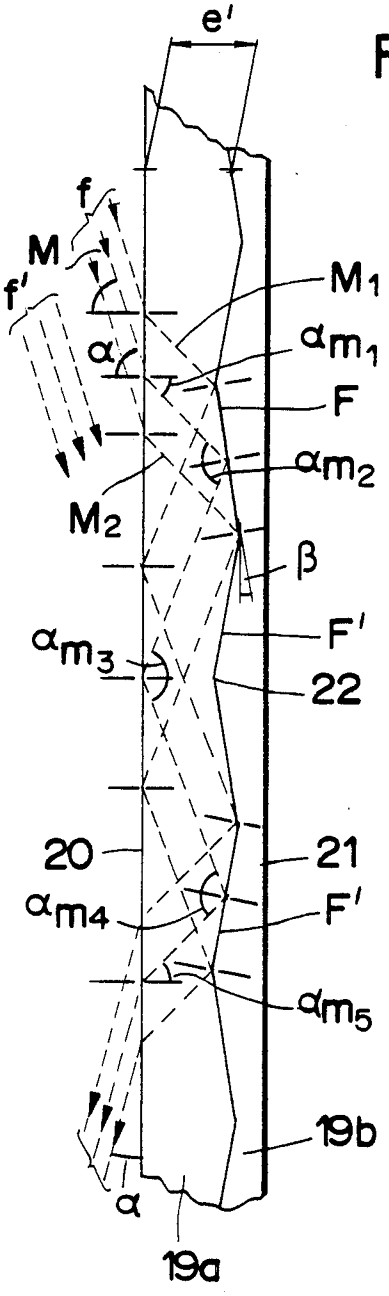
FIG. 4 is a view similar to FIGS. 2 and 3, illustrating the determination of another group of parameters of the panel according to the invention.

As may be seen in FIG. 1, the essential part of a panel in one of the embodiments of the invention is composed of four flat, rectangular plates 1,2,3,4 placed face to face and assembled as a single block. Plates 1–4 may be of any rigid, stable, transparent material having an index of refraction satisfying certain conditions which will become apparent below. The way in which the plates are assembled is not shown in the drawing. It would be possible, for instance, to provide a frame surrounding the panel assembly and holding its several component plates together. In the embodiment shown in the drawing, each plate such as 1,2,3, or 4 has a flat front face, such as face 5 of plate 1, and a rear face formed of a series of facets, such as facets 6 of plate 1.

Facets 6 are elongated, rectangular surface elements bounded by parallel ridges 7 extending horizontally. Furthermore, the adjacent facets have slopes which are symmetrical with respect to planes containing a ridge 7 and, moreover, perpendicular to the general plane of the panel, i.e., to front face 5. Thus, facets 6 form a series of regular, symmetrical prisms constituting the relief of the plate on the face opposite its front face 5.

It will be seen that the two plates 1 and 2 are assembled in such a way that their relief faces are fitted together and that the flat front faces are opposite. It will also be seen that the panel element made up of plates 3 and 4 likewise forms a body in the shape of a rectangular parallelepiped having two opposite flat faces, and that this panel element is coupled with the element formed by plates 1 and 2, behind which it is situated. The merged ridges of the apices of the prisms formed by the relief faces of plates 3 and 4 are designated in FIG. 1 by reference numeral 8, and it will be noted that the homologous ridges of element 3, 4 are offset downward relative to ridges 7 of element 1, 2. As for the angles of the facets, their arrangement, their width, and the average thickness of plates 1,2,3,4, the way in which these are determined will be explained below, this playing an essential part in achieving the desired object.

First, however, the appearance and conditions of the phenomenon of total reflection will be described with reference to FIG. 2 considering a segment of a panel element composed of two transparent plates 9 and 10 which are coupled like plates 1 and 2 or plates 3 and 4 of FIG. 1, and the relief faces of which exhibit a configuration of facets 11 bounded by horizontal ridges 12. In FIG. 2, the panel segment is seen as cut on a vertical plane perpendicular to its flat opposite faces 13 and 14.

We shall now assume that a source of luminous and infrared radiation (not shown) emits parallel rays in the sectional plane and in a direction which forms an angle $\alpha$ with a line perpendicular to the plane of the panel. More precisely, it shall be assumed that angle $\alpha$ has a specific value between 90° and the angle designated $\alpha_b$ in FIG. 2, hence that the direction of these rays is situated within the angle formed by vectors a and b in FIG. 2. The parallel rays strike face 13 of the panel and arrive at point P at the indicated angle $\alpha$. The panel being transparent, they enter into plate 9, undergoing refraction, so that within that plate these rays will be oriented at an angle $\alpha_1$ measured relative to the line perpendicular to the panel and included between the two limiting valves $\alpha_{1a}$ and $\alpha_{1b}$, i.e., within the refracted beam shown in FIG. 2. It will thus be seen that part of the beam refracted within plate 9 arrives at one of the facets 11 designated as F and sloping downward, the angle of this facet relative to a vertical plane parallel to face 13 being designated as $\beta$.

Each ray of the refracted beam will undergo total reflection from facet F if the angle $\alpha_1$ which it forms relative to the line perpendicular to the panel is between the two limits $\alpha_{1a}$ and $\alpha_{1b}$, and if, moreover, the following relationships exist for these two limits:

$$\alpha_{1a}=\alpha_t$$

$$\alpha_{1b}=\alpha_t-\beta \qquad (1)$$

$$\alpha_{m1}=\alpha_t-\beta/2 \qquad (1a)$$

In these equations, $\alpha_t$ is the critical angle; and for a panel material having an index of refraction n, $\alpha_t$ is known to be defined by equation (2):

$$\sin \alpha_t=1/n \qquad (2)$$

For example, if the index of refraction n is 1.5, angle $\alpha_t$ is known to be about 42°; and if, moreover, the angle of inclination of facets F is 8°, thus $\beta=8°$, total reflection will occur from each facet F sloping downward provided that the direction of the radiation coming from the source in the vertical plane perpendicular to the panel is between the vertical, i.e., direction a, and an oblique direction, say, direction be forming an angle on the order of 57° to the horizontal. Therefore, in an example satisfying the conditions given above, we have for the boundary conditions equation (3), giving the value of the critical angle of incident radiation:

$$\alpha_b=57° \text{ (for n=1.5)} \qquad (3)$$

Thus, for a structure such as that illustrated in FIG. 2, any incident ray striking at an angle between the limits a and b will undergo total reflection if it strikes a facet F sloping downward, whereas it will obviously pass through the facets F′ which are upwardly inclined.

Figure 3:
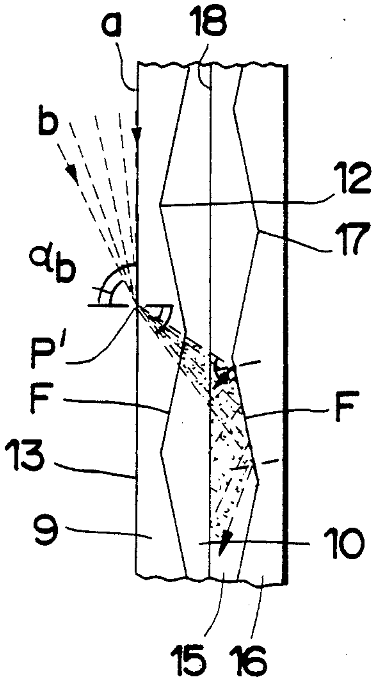
FIG. 3 is another diagrammatic cross sectional view serving to explain the determination of structural parameters of the panel.

However, for an average angle of incidence $\alpha_{ml}$ within the limits described above, it is possible to produce a panel structure which causes total reflection of all the parallel rays by using the arrangement illustrated diagrammatically in FIG. 3. This drawing figure again shows an assembly formed of a panel element comprising two plates 9 and 10 and of a second panel element comprising two plates 15 and 16 of the same structure as plates 9 and 10, but wherein the horizontal ridges 17 of the prisms are offset downward relative to the homologous ridges 12 of the prisms of element 9, 10.

In FIG. 3, parallel rays situated in a vertical plane perpendicular to the panel arrive at front face 13 thereof at an angle between 90° and angle $\alpha_b$, i.e., these rays are situated within the beam defined by directions a and b, as in FIG. 2. Here, however, the radiation arrives at face 13 at a point P′ such that the refracted beam, which forms with a horizontal plane an angle $\alpha_1$ situated between angles $\alpha_{1a}$ and $\alpha_{1b}$ efined by equation (1) above, arrives at the interface between plates 9 and 10 upon a facet F oriented upwardly and consequently passes through this facet. This radiation will likewise pass through the flat, vertical interface 18 between element 9, 10 and element 15, 16 to arrive at a downwardly sloping facet F of the interface between plates 15 and 16. For the reasons explained above, this radiation will therefore undergo total reflection from this facet F of the interface between plates 15 and 16, so that the radiation will be reflected toward front face 13.

The vertical offsetting of homologous ridges 17 and 12 of the two interfaces can obviously be adjusted to produce total reflection of the entirety of parallel rays only for the average angle of elevation $\alpha_{m1}$ given by equation (1a) above. Experience has shown, however, that if this angle varies within the limits defined by directions a and b, the proportion of radiation which nevertheless passes through the two panel elements 9, 10 and 15, 16 remains relatively small, and that in any event, the major part of the radiation undergoes total reflection and is returned toward face 13.

FIG. 4 shows a panel element formed of two plates 19*a* and 19*b* having a flat front face 20 and a flat rear face 21, these two faces being parallel. Within the thickness of the element, an interface is formed of flat facets disposed at an angle to the line perpendicular to the panel, bounded by parallel, horizontal ridges 22 situated in two planes parallel to each other and to faces 20 and 21. Thus, the facets are equal in width and are so disposed as to form symmetrical prisms staggered in a vertical plane.

A first incident beam portion f, the direction of which is contained in the plane of the section, forms with vertical plane 20 an angle $\alpha$ representing the angle of incidence, situated between the vertical direction congruent with face 20 of the panel and the critical angle represented by direction b in FIG. 2. Considering that this beam is refracted within plate 19a at angle $\alpha_1$ so as to strike a facet F sloping downward and forming angle $\beta$ with the vertical plane, we see that the angle of incidence of the beam refracted onto facet F, measured relative to a plane perpendicular to that of facet F, this angle being designated $\alpha_2$, is defined by equation (4):

$$\alpha_2=\alpha_1+\beta \quad (4)$$

Thus, if angle $\alpha_1$ is already greater than the critical angle causing total reflection, the beam will be reflected from facet F and returned toward face 20; and its angle of incidence on face 20, designated $\alpha_3$, will be defined by equation (5):

$$\alpha_3=\alpha_2+\beta=\alpha_1+\beta_2 \quad (5)$$

Angle $\alpha_3$ will necessarily be greater than the critical angle, by virtue of equation (5), so that total reflection will again take place, this time from face 20, and the refracted and reflected beam will be returned toward the interface between plates 19a and 19b.

Now, if the average thickness of plate 19a satisfies certain dimensional conditions, this refracted and reflected beam, or at least the major part of it, will arrive at an upwardly inclined fact F', so that after having undergone total reflection once more, it will be directed toward face 20 at an angle $\alpha_5$, equal to angle $\alpha_1$, and will be refracted again toward the outside at angle $\alpha$, but this time directed downward. In order to show this, the median parallel ray designated M in FIG. 4 shall be considered. From facet F, this ray is reflected along a line perpendicular to the plane of the drawing and situated halfway between the two horizontal ridges of facet F. It shall now be assumed that the average thickness of element 19a, i.e., the distance between the line on which reflection of ray M takes place and face 20, this average thickness being designated e', satisfies the following equation (6):

$$e' = \frac{3}{2}\, l \cos \beta / \tan \alpha_{m3} \quad (6)$$

wherein l is the width of facets F. If these conditions are observed, ray M is reflected by face 20 along a horizontal line situated exactly opposite one of the ridges 22, this ridge itself forming the lower edge of the facet F downwardly adjacent to the one from which ray M was reflected the first time. The arrangement of FIG. 4 shows that under these conditions, ray M undergoes total reflection at the median line of facet F', and angle $\alpha_4$, the angle of incidence upon this facet F', is defined by equation (7):

$$\alpha_4=\alpha_3-\beta=\alpha_2 \quad (7)$$

Thus, the relationship $\alpha_5=\alpha_1$ as mentioned above is observed.

On the other hand, it will be realized that for a second partial beam f' having the same inclination but limited in such a way as to undergo total reflection for the first time from another downwardly sloping facet F, the reflection conditions will be the same, so that this partial beam will likewise be sent back out of the panel on the side where face 20 is situated.

Upon considering an assembly formed of two panel elements such as have been described with reference to FIG. 3, rather than an element formed of two plates such as 19a and 19b, it will be understood that under conditions described, the radiation incident upon face 20 of the panel at angle $\alpha$ is entirely reflected provided that angle $\alpha$ is between 90° and the critical angle, $\alpha_b$, determined by the index of refraction of the material and the angle of slope of facets F. On the other hand, the panel is transparent to radiation forming an angle smaller than the critical angle with a line perpendicular to the panel. Furthermore, as the two outer faces bounding the panel with respect to the outside environment are plane and parallel, the radiation passing through the panel does so without being deformed, which means that there is total transparency and, in particular, that what is situated on one side of the panel is visible from a viewing point situated on the other side without deformation of the image.

A median ray M which strikes the facets in the middle of their width has been considered above. The rays parallel thereto, but above and below it, will describe different paths within the panel element. However, broken lines $M_1$ and $M_2$ in FIG. 4 show that the whole beam striking a facet F at angle $\alpha_2$ will be ejected from the panel again even if the paths followed by the various rays are not absolutely symmetrical.

On the other hand, it is true that beams having an angle of incidence slightly different from the average incidence $\alpha_m$ will not necessarily end up on the symmetrical facet F' even if they are entirely reflected by a facet F. It should be noted, however, that the final reflection may equally well take place from another upwardly directed facet F', so that when thickness e' has been determined as a function of an average angle $\alpha_{m3}$ corresponding to the characteristics of the panel, there may also be a value, defined by the following equation (8), for reflected rays of which angle $\alpha_3$ is different from the angle $\alpha_{m3}$ appearing in equation (6) above $$\tan\alpha_3=(m+\tfrac{1}{2})l \cos \beta/e' \quad (8)$$

wherein m is an integer other than 1, even 0, if need be. Preferably, the smaller angle $\beta$, the closer this number is to zero.

The case which remains to be considered is the more general one in which the direction of the incident radiation is not contained in a vertical plane perpendicular to the general plane of the panel but rather in an oblique plane. However, the explanations given above may be easily transposed to such a case, although the successive reflections of a refracted beam take place in different planes. It will be realized that analogous conditions are encountered and that the major part of the incident radiation is then either sent out again on the side on which the source is situated after having undergone total reflection one or more times, or else this radiation passes through the panel and the ratio of reflection to transmission is abruptly modified, i.e., it passes practically from zero to one or from one to zero for a given angle of incidence, the value of which can be precisely determined.

Figure 5:
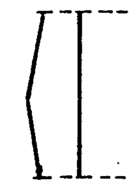
FIGS. 5 and 6 are graphs representing the selection characteristics of two other embodiments of the panel.
Figure 5:
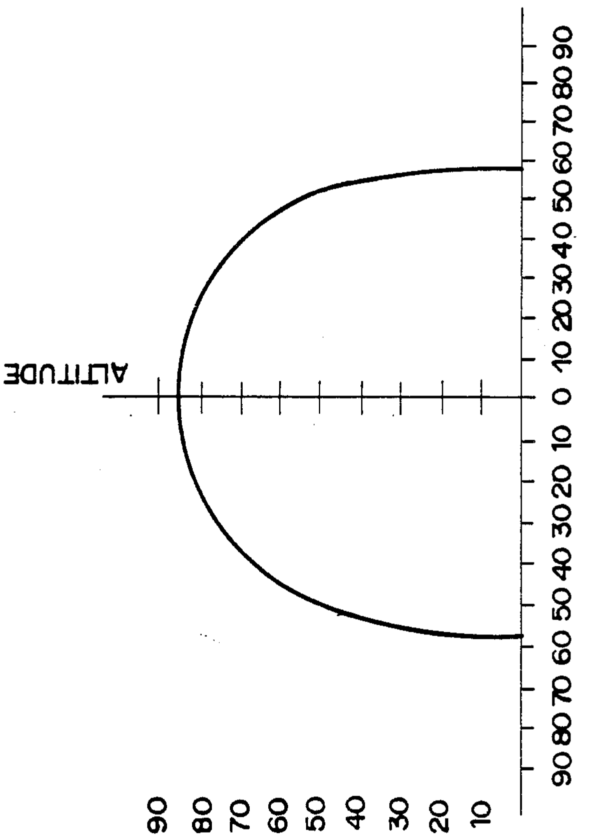

FIG. 5 provides an example of the graph which can be plotted on the basis of an approximate calculation in order to show the characteristics of a panel. In this graph, the azimuth is indicated on the x-axis, while the angle of elevation or altitude is indicated on the y-axis. The example on which this graph is based is a vertical panel in which rectangular facets are oriented vertically. Thus, the ridges of the prisms are vertical. The prisms themselves are symmetrical, and the angle $\beta$ of each facet relative to the general plane of the panel is on the order of 8°.

For a source irradiating the panel horizontally, the incident rays are returned in the direction of the source provided that their angle of incidence, measured relative to a line perpendicular to the panel, is between 57° and 90°. If the radiation is directed obliquely and its angle of elevation is 45°, for example, the maximum angle of incidence projected on the horizontal plane reaches 50°. Finally, for radiation contained in a vertical plane, i.e., the azimuth of which is 0°, it will be seen that if the angle of incidence is less than 83°, the radiation passes through the panel, and the latter is therefore transparent to such radiation.

For a panel in which the facet configuration has the same aspect, but which is rotated so that the ridges of the facets are horizontal, a graph giving its characteristics would look like the graph of FIG. 5 except that the curve would be rotated by 90°, so that the limit of 57° would be in the vertical plane and the limit of 83° in the horizontal plane.

The aspect of these graphs will, of course, depend especially upon the inclination of the facets to the general plane of the panel. For radiation contained in a plane perpendicular to the panel and perpendicular to the ridges of the facets, the maximum angle of incidence depends directly upon the slope of the facets. Thus, for an angle of 8°, we have seen that this maximum angle of incidence attains 57°. If the angle of slope of the facets reaches a value complementary to the critical angle, the maximum incidence drops to 0°.

Figure 6:
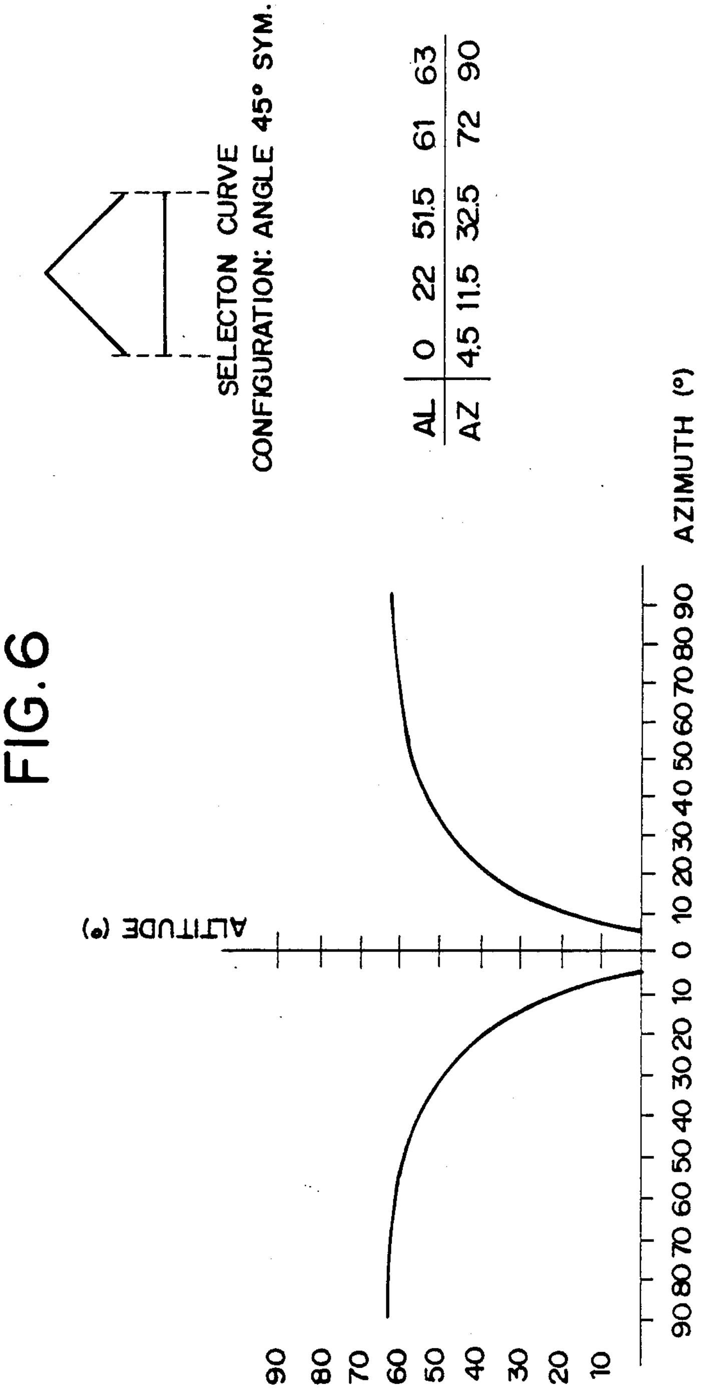

If we consider a panel with a configuration of facets having this slope or one close to it, e.g., a 45° angle, and in which the ridges are vertical when the panel is vertical, the resultant graph of characteristics is as shown in FIG. 6. For incident radiation contained in a vertical plane perpendicular to the panel, whatever the angle of incidence of this radiation may be, it is returned toward the source. It undergoes two total reflections on two adjacent facets.

If the radiation, instead of being contained in a vertical plane perpendicular to the panel, is contained in a vertical plane oriented along an azimuth other than zero relative to the panel, we find a maximum angle of incidence below which the panel becomes transparent. Therefore, the graph of FIG. 6 shows the maximum angle of incidence as a function of the azimuth of the direction of the radiation.

Until now, panel designs have been envisaged in which the facets are bounded by parallel ridges; but it should be understood that designs in which, for instance, the ridges of the prisms formed by the facets issue from a central point, and in which the facets are consequently triangular, likewise come within the framework of panels acting selectively upon the incident radiation, in conformity with the general concept of this invention. Those skilled in the art will be in a position to conceive of other arrangements, and calculation of the parameters determining the construction of a panel will make it possible to produce practically any function desired, between the maximum elevation and the azimuth of the source. Owing to this possibility, panels having very varied properties can be produced at will, those illustrated by FIGS. 5 and 6 being only simple examples.

The foregoing disclosure speaks of a source of radiation situated outside the panel and irradiating it at an angle which may be variable. When the invention is applied to the production of panels constituting outside walls of buildings, the source of radiation in question will usually be the sun; and it will be understood that in type of application, a vertical wall oriented toward the south, for example, will be transparent to the rays of the sun as long as the angle they form with the wall is within the curve given by the graph of characteristics, whereas if the elevation of the sun increases beyond the maximum value, the panel becomes reflective of the radiation and consequently keeps the inside of the building from being overheated by the greenhouse effect.

However, the panels described can also be used facing radiation sources of some other kind. Thus, for instance, they can be used in vertical partitions situated inside or outside of buildings, bounding a space to be heated by means of a source of luminous and/or infrared radiation. This source may be placed near the upper part of the panel and irradiate the panel obliquely. While the panel remains perfectly transparent when viewed perpendicularly, the radiation which strikes its active face at an angle will be completely reflected back to the location to be heated.

As has already been stated, any transparent, rigid, stable manterial having a suitable index of refraction can be used to make panels according to this invention. The materials which principally enter into consideration are naturally mineral glass, or, as the case may be, transparent plastic materials. It has been found that highly efficient panels can be made up of panes of glass having an average thickness of about 5 to 7 mm with one plane face and the other face provided with facets in the form of symmetrical prisms. An advantageous angle for the facets designated $\beta$ above is 8°, the facets themselves being on the order of 10 mm wide. Panes of glass of this kind can easily be manufactured in a rolling-mill having rolls provided with reliefs which determine the shape of the facets.

It has furthermore been found than an angle of 33° is favorable for producing a relief formed of facets determining symmetrical prisms in the relief face of the panel. However, it will be obvious that a configuration of facets forming symmetrical prisms having straight, parallel ridges is not the only possible way of designing the panels described; asymmetrical prisms, or facet configurations forming reliefs having forms other than prisms are likewise among the contemplated embodiments. In particular, in the case of panels made of sheets of plastic material, the relief may be formed by molding, and this method of manufacture affords greater liberty as regards the form of the relief than does manufacture by rolling.

For assembling the several plates making up a panel, they may be fixed by means of rigid elements surrounding the panel and serving as a frame for it. Another possibility would be to use a cement or other adhesive applied at predetermined locations between the plates or distributed along their circumference.

The panels are not necessarily intended to be placed in a vertical position. As stated at the beginning, panels intended to be used for a roof or shelter may also be produced. In that case they are disposed either horizontally or sloping. Roofing for sheds, carports, overhangs, terraces, etc., made of such panels can be envisaged. Generally speaking, the facets may be inclined at any suitable angle. As a rule, however, a slope of more than 45° yields less satisfactory results and may thus be avoided, all the more so as the rigidity of the prisms is then no longer adequate.

Among the possible types of embodiment, assemblies such as that of FIG. 1 should also be mentioned, comprising, as the case may be, more than two pairs of complementary plates with a configuration of facets at the inner interface of each pair. In such assemblies, the angles of the facets may be different from one pair of plates to the next.

The structural rules given previously naturally also apply to the production of panels of transparent material having a certain coloring. However, coloring glass leads to some absorption of the light. Now, the main advantage of the panels described above is that the rays which do not pass through the panels are reflected out of the panel towards the light source; hence there is no absorption except that corresponding to the absorption factor of the transparent material itself, and consequently no heating up when the panels are exposed to direct solar radiation.

However, a set of facets may form one or the other of the two outer faces of a panel; especially the outer face turned toward the souce of radiation may be formed of a set of facets.

Finally, it will be noted that in all the embodiments described above, all the faces and facets of the various plates making up the panels are smooth and devoid of any coating. The only luminous phenomena which take place are refraction and total reflection, so that the phenomena of diffusion and absorption are substantially absent.

What is claimed is:

1. A panel for selectively transmitting or reflecting radiation from a source of radiation located on a front side of the panel comprising:

two pairs of rigid planar elements of transparent material having outer planar faces assembled face to face to form said panel having front and rear faces and a general plane;

each element of each pair of elements having a planar face and a face having a series of adjacent protruding prism-shaped portions formed by facets inclined at an angle with respect to a plane extending parallel to said general plane of said panel and meeting at parallel ridges;

each pair of elements being formed by meshing engagement of said faces having said protrusions so that said facets and ridges on one element are in abutting relationship with said facets and ridges on the other element;

said pairs of elements when assembled to form a panel having said meshing ridges of one pair offset with respect to said meshing ridges of the other pair in a direction parallel to said general plane and perpendicular to the direction of said ridges;

the average thickness of said elements, the width and said angle of inclinations of said facets with respect to said general plane, and said offset being predetermined so that said panel has the same transmitting or reflecting property for substantially all the radiations striking it at any given point at a given angle of incidence $\alpha$ with respect to a plane perpendicular to said general plane, the transmitting or reflecting property selectively depending on said angle $\alpha$ only, and the reflecting property being exclusively due to total reflection of said radiations on said facets.

2. A panel as claimed in claim 1 wherein, said facets form a series of symmetrical prisms of equal size, and said parallel ridges are longitudinal ridges bounding said prisms and lying in two parallel planes parallel to said general plane.

3. A panel as claimed in claim 2 wherein, said angle of inclinations of said facets with respect to the general plane is about 8°, and said panel has a reflecting property for angles $\alpha$ greater than a limit value.

4. A panel as claimed in claim 2 wherein, said angle of inclination of said facets with respect to the general plane is about 45°, and said panel has a transmitting property for angles $\alpha$ greater than a limit value.

5. A panel is claimed in claim 1 wherein, a first one of said planar elements is on said front side of said panel, a second of said planar elements is on the opposite rear side of said panel, each of said first and second planar elements has an outer planar face constituting said front and rear faces of said panel, said front and rear faces are parallel, and said pairs of elements are arranged so that any radiation traversing said panel at an angle $\alpha$ less than that for which a transmitting property is available traverses said panel without deviation and objects are viewable through said panel without distortion.

6. A panel is claimed in claim 1 and further comprising, means distributed along the periphery of said planar elements for holding said planar elements together.

7. A panel as claimed in claim 3 wherein, a first one of said planar elements is on said front side of said panel, a second of said planar elements is on the opposite rear side of said panel, each of said first and second planar elements has an outer planar face constituting said front and rear faces of said panel, said front and rear faces are parallel, and said pairs of elements are arranged so that any radiation traversing said panel at an angle $\alpha$ less than that for which a transmitting property is available traversessaid panel without deviation and objects are viewable through said panel without distortion.

8. A panel as claimed in claim 4 wherein, a first one of said planar elements is on said front side of said panel, a second of said planar element is on the opposite rear side of said panel, each of said first and second planar elements has an outer planar face constituting said front and rear faces of said panel, said front and rear faces are parallel, and said pairs of elements are arranged so that any radiation traversing said panel at an angle $\alpha$ less than that for which a transmitting property is available traverses said pannel without deviation and objects are viewable through said panel without distortion.

* * * * *